(12) United States Patent
Ullrey et al.

(10) Patent No.: US 8,376,398 B2
(45) Date of Patent: Feb. 19, 2013

(54) AIRBAG AND HORN SWITCH MODULE AND METHOD OF ASSEMBLY OF THE MODULE

(75) Inventors: Timothy Michael Ullrey, Farmington Hills, MI (US); James Ryan Fletcher, Bloomfield, MI (US); Sara Roberson, Leonard, MI (US); Patrick O'Leary, Clinton Township, MI (US); Joshua Thompson, Livonia, MI (US)

(73) Assignee: TK Holdings Inc., Auburn Hills, MI (US)

( * ) Notice: Subject to any disclaimer, the term of this patent is extended or adjusted under 35 U.S.C. 154(b) by 36 days.

(21) Appl. No.: 13/181,095

(22) Filed: Jul. 12, 2011

(65) Prior Publication Data

US 2013/0015645 A1    Jan. 17, 2013

(51) Int. Cl.
    *B60R 21/16*    (2006.01)
(52) U.S. Cl. ........................................ 280/731
(58) Field of Classification Search ............... 280/728.2, 280/731; 200/61.54, 61.55, 61.56
    See application file for complete search history.

(56) References Cited

U.S. PATENT DOCUMENTS

| | | | | |
|---|---|---|---|---|
| 6,062,592 A * | 5/2000 | Sakurai et al. | ............ | 280/728.2 |
| 6,398,255 B1 * | 6/2002 | Scherzinger et al. | ......... | 280/731 |
| 6,554,312 B2 * | 4/2003 | Sakane et al. | ............ | 280/728.2 |
| 6,719,324 B2 * | 4/2004 | Richards et al. | ............ | 280/731 |
| 6,908,102 B2 * | 6/2005 | Sugimoto | .................. | 280/728.2 |
| 7,322,602 B2 * | 1/2008 | Tsujimoto et al. | ............ | 280/731 |
| 7,963,554 B2 * | 6/2011 | Nakagawa et al. | ........... | 280/731 |
| 2004/0090052 A1 * | 5/2004 | Sugimoto | .................... | 280/731 |
| 2005/0151354 A1 * | 7/2005 | Sugimoto | .................... | 280/731 |
| 2005/0248135 A1 * | 11/2005 | Poli et al. | ...................... | 280/731 |
| 2006/0175816 A1 * | 8/2006 | Spencer et al. | ............... | 280/731 |
| 2007/0152428 A1 * | 7/2007 | Poli et al. | .................... | 280/728.2 |

\* cited by examiner

*Primary Examiner* — Toan To
(74) *Attorney, Agent, or Firm* — Foley & Lardner LLP

(57) ABSTRACT

An airbag and horn switch module, for use in a vehicle, is provided and includes an inflatable airbag cushion configured to provide restraint to the occupant, an inflator configured to inflate the airbag cushion, and a housing having a base and a plurality of walls extending from the base thereby forming a cavity configured to house the airbag cushion. At least one wall of the housing has at least one tab protruding therefrom. The module also includes a switch assembly including an electronic switch and an actuator, and a cover having a wall with at least one opening configured to receive the tab of the housing to thereby slideably couple the cover to the housing. The cover is configured to slideably couple to the housing prior to installation of the electronic switch by aligning the tab of the housing with the opening in the cover. The cover is configured to slide relative to the housing when the cover is depressed by the occupant, whereby the cover displaces the actuator into engagement with the electronic switch thereby activating the horn assembly of the vehicle.

20 Claims, 12 Drawing Sheets

AIRBAG AND HORN SWITCH MODULE AND METHOD OF ASSEMBLY OF THE MODULE

BACKGROUND

The present application relates generally to the field of airbag modules configured for use in vehicles, such as motor vehicles, to provide restraint to an occupant of the vehicle. More specifically, the present application relates to an airbag module having an integrated switch assembly and cover, whereby depressing the cover, such as by the driver, activates the switch assembly and activates the horn of the vehicle.

SUMMARY

According to a disclosed embodiment, an airbag module configured for use in a vehicle to provide restraint to an occupant and to provide selective activation of a horn assembly of the vehicle, is provided. The airbag module includes an inflatable airbag cushion configured to deploy from a stored configuration to provide restraint to the occupant, an inflator configured to inflate the airbag cushion upon deployment, and a housing. The housing includes a base and a plurality of walls extending from the base thereby forming a cavity configured to house the airbag cushion, and having the inflator attached thereto. At least one wall of the housing has at least one tab protruding therefrom. The airbag module also includes a switch assembly including an electronic switch and an actuator, and a cover having a wall with at least one opening configured to receive the tab of the housing to thereby slideably couple the cover to the housing. The cover is configured to slideably couple to the housing prior to installation of the electronic switch of the switch assembly by aligning the tab of the housing with the opening in the cover, thereby providing an increased length of engagement between the tab of the housing and the cover. The cover is also configured to slide relative to the housing when the cover is depressed by the occupant, whereby the cover displaces the actuator into engagement with the electronic switch thereby activating the horn assembly of the vehicle.

The module may be configured such that after installation of the electronic switch to the housing, the cover is unable to slide a distance relative to the slideably coupled housing that would realign the opening in the cover and the tab of the housing, thereby preventing the cover from becoming decoupled from housing, such as during airbag deployment. The airbag module may also include a biasing member provided between the housing and the actuator of the switch assembly, such that displacement of the cover and actuator relative to the housing induced by the occupant depressing the cover compresses the biasing member storing energy therein. Upon the occupant removing the force depressing the cover, the stored energy in the biasing member displaces the actuator and the cover away from the housing and switch, thereby deactivating the horn of the vehicle. The airbag module may further include a wiring harness having an electrical connector to communicate electrically between the electronic switch and the horn assembly of the vehicle.

The housing may include a socket configured to receive at least a portion of the switch assembly. For example, the socket of the housing may receive the actuator of the switch assembly, and guide the actuator during displacement to activate the electronic switch. The housing may also include a compartment configured to receive at least a portion of the electronic switch of the switch assembly. The electronic switch may couple to the compartment to retain the electronic switch to the housing. The cover may include a tear seam configured to separate during deployment of the airbag cushion to allow the inflating cushion to deploy beyond the module to a position to provide restraint to the occupant. The module may be positioned in a steering wheel assembly and configured to engage the steering column of the vehicle. The module may include an attachment member for connecting the module to the steering wheel, which may couple to the steering column of the vehicle.

Also disclosed is a method of constructing an airbag and horn switch module for use in a vehicle to provide restraint to an occupant and to provide activation of a horn assembly of the vehicle. The method includes a first step of installing an inflator to a housing, a second step of connecting a folded airbag cushion to the inflator in the housing, a third step of inserting an actuator and a biasing member within a socket of the housing, and a fourth step of slideably coupling a cover to the housing. The cover is displaced toward the housing in turn displacing the actuator into a compartment of the housing, and compressing the biasing member thereby storing energy therein. The cover is displaced toward the housing until an opening in a wall of the cover aligns with a tab extending from a wall of the housing, whereby the tab of the housing engages the opening of the cover. The method also includes a fifth step of displacing the cover away from the housing, whereby the stored energy of the biasing member displaces the actuator out of the compartment of the housing; and a sixth step of installing an electronic switch into the compartment of the housing, thereby retaining the coupled cover to the housing by preventing the cover from being able to displace toward the housing a distance that would realign the opening of the cover and the tab of the housing. The third step of the method may include inserting a plurality of actuators and biasing members within a plurality of sockets of the housing, such that each socket includes one actuator and one biasing member.

Also disclosed is an electronic switch assembly for use in an airbag and horn assembly module to provide selective activation of a horn assembly of the vehicle by an occupant, the airbag and horn assembly module also having a housing and a cover that is slideably coupled to the housing. The electronic switch assembly includes an electronic switch configured to couple to the housing, and configured to operate in an open position or a closed position. The electronic switch is normally configured in the open position whereby the horn assembly of the vehicle is deactivated. The electronic switch includes a contact, and is configured in the closed position when the contact moves a predetermined distance, whereby the horn assembly of the vehicle is activated. The switch assembly also includes an actuator configured to move the contact of the electronic switch the predetermined distance when the cover is depressed by the occupant; and a spring positioned between the electronic switch and the actuator. The spring is configured to bias the actuator away from the contact of the electronic switch to thereby configure the electronic switch in the open position.

The actuator may include a guide provided adjacent to a portion of the housing to align the actuator with the contact of the electronic switch. The guide may be annular and extend from a base, which is adjacent to a portion of the cover. The guide may surround at least a portion of the spring thereby retaining the spring. The actuator may also include a contact portion configured to directly contact the contact of the electronic switch. The spring may be provided between the contact portion and the guide of the actuator.

DETAILED DESCRIPTION

Figure 1:
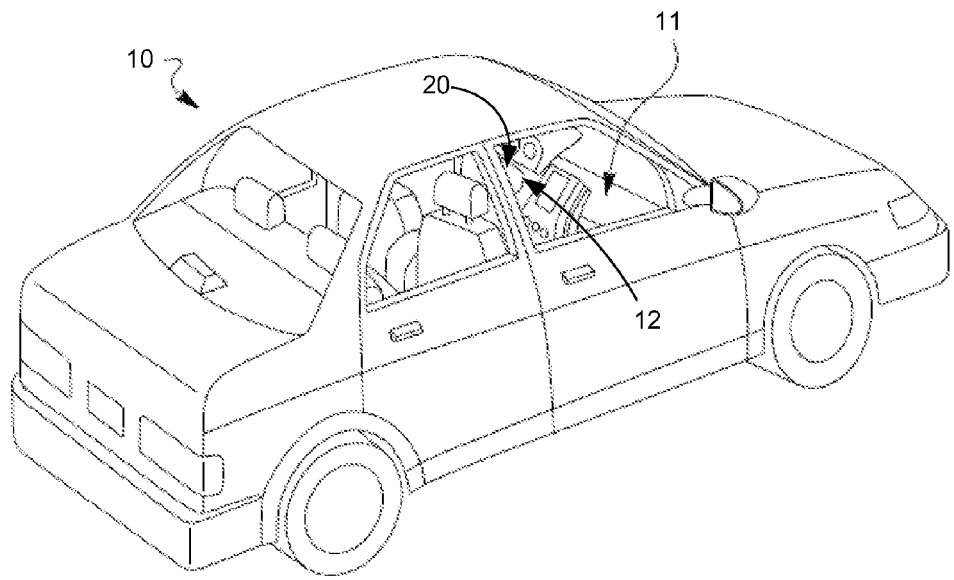
FIG. 1 is a perspective view of a motor vehicle configured to include an airbag module having an integrated horn switch assembly to provide occupant restraint and selective activation of the horn.
Figure 2:
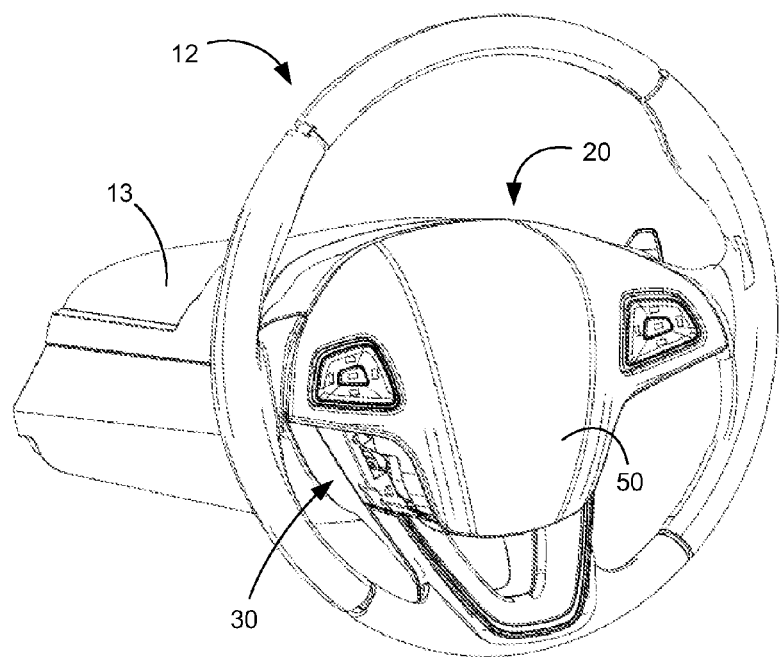
FIG. 2 is a perspective view of an exemplary embodiment of a driver-side airbag module that is coupled to the steering wheel and the steering column of the vehicle.
Figure 3A:
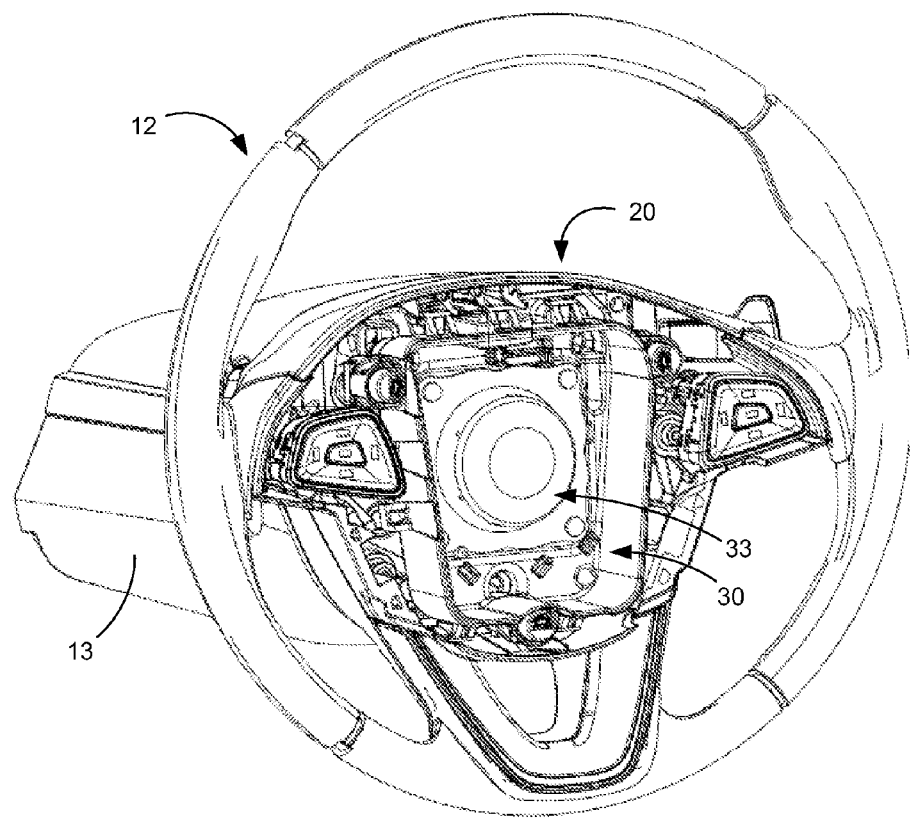
FIG. 3A is a perspective view of the coupled driver-side airbag module and steering wheel of FIG. 2, shown with the cover and airbag cushion removed for clarity.
Figure 3B:
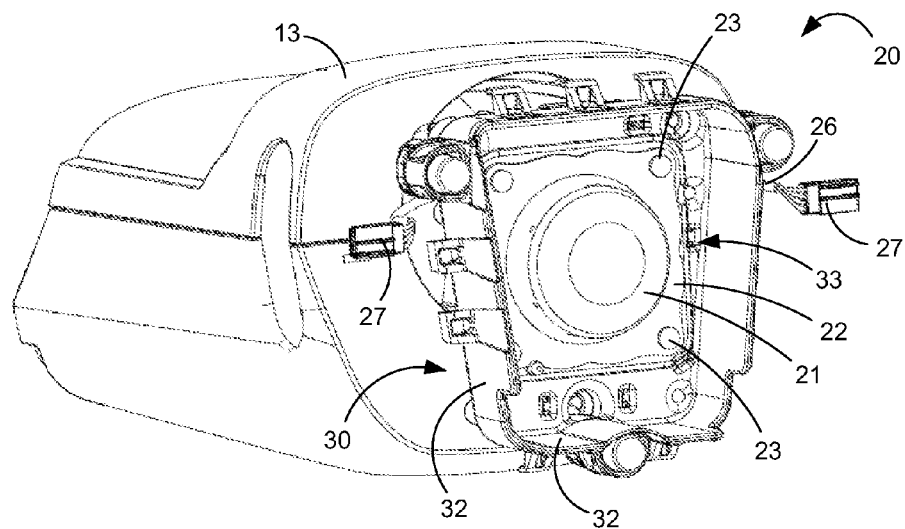
FIG. 3B is a perspective view of the driver-side airbag module of FIG. 3A with the steering wheel also removed for clarity.

A driver-side airbag (DAB) module or assembly may be installed into the steering wheel and connected to the steering column of the vehicle to restrain and protect the driver of the vehicle during airbag deploying events, such as frontal impacts of the vehicle. The DAB module may be configured to include a horn switch and cover that when depressed a predetermined distance activates the horn switch thereby activating (e.g., sounding) the horn of the vehicle.

It is currently known to construct a DAB module using a floating cover to reduce the sprung mass, which in turn allows for use of springs with lower spring rates to reduce the force required to be exerted on the floating cover to depress the cover the predetermined distance to activate the horn switch and sound the horn. However, these conventional airbag modules are configured so that the cover is assembled last (i.e., after the complete switch assembly and airbag assembly are assembled), which limits the length of engagement between the cover and the base member of the airbag module. Additionally, to provide for an increased length of engagement, these airbag modules include more than one spring in series, which adversely increases the force required to depress the cover to activate the horn switch.

It is desirable to have as much length of engagement of the tabs (or hooks) as possible between the cover and the base member to reduce the likelihood of the cover from separating from the airbag module during deployment. The airbag modules discussed herein provide an improved length of engagement without the need of an increased spring rate (and force to activate the horn switch), by having an improved structure and method of assembly.

Airbag modules are typically located in vehicles to protect occupants from injury during vehicle airbag deploying events. Typically, airbag modules are connected to sensors located in the vehicle, which initiate deployment of the airbag based on information received and monitored through the sensors. Airbag modules often include at least one inflatable airbag cushion, which may deploy and inflate from high pressure gas, typically generated by an inflator. The inflator may contain an explosive charge (e.g., pyrotechnic device) or may include some other device for rapidly generating inflation gas, which enters the airbag cushion at a high volumetric flow rate and expands the airbag cushion by increasing the internal chamber pressure of the airbag cushion.

DAB modules are typically stored within and deployed from the steering wheel of the vehicle, and are typically packaged through a process of folding, rolling, or a combination of folding and rolling to compact the airbag cushion in order to minimize its packaging volume in order to fit within the steering wheel. During a vehicle dynamic impact event, the DAB module may initiate and deploy the airbag cushion from the stored position within the steering wheel in a substantially rearward direction towards the driver of the vehicle to a position between the steering column and the driver to restrain the driver, such as the thorax and head of the driver.

FIG. 1 illustrates an exemplary embodiment of a motor vehicle 10 that includes a passenger compartment 11 to provide seating capacity to occupants of the vehicle 10, a steering wheel 12 for controlling the driving direction of the vehicle through driver manipulations, and a DAB module 20 to restrain the driver, such as during a vehicle impact event. The vehicle 10 is illustrated as a typical sedan, but the airbag modules disclosed herein may be used within any type of passenger vehicle (e.g., SUV, truck, etc.) as well as any other moving vehicle (e.g., military, mass-transit) that offer occupant protection to seated passengers in the form of frontal airbags.

Figure 4A:
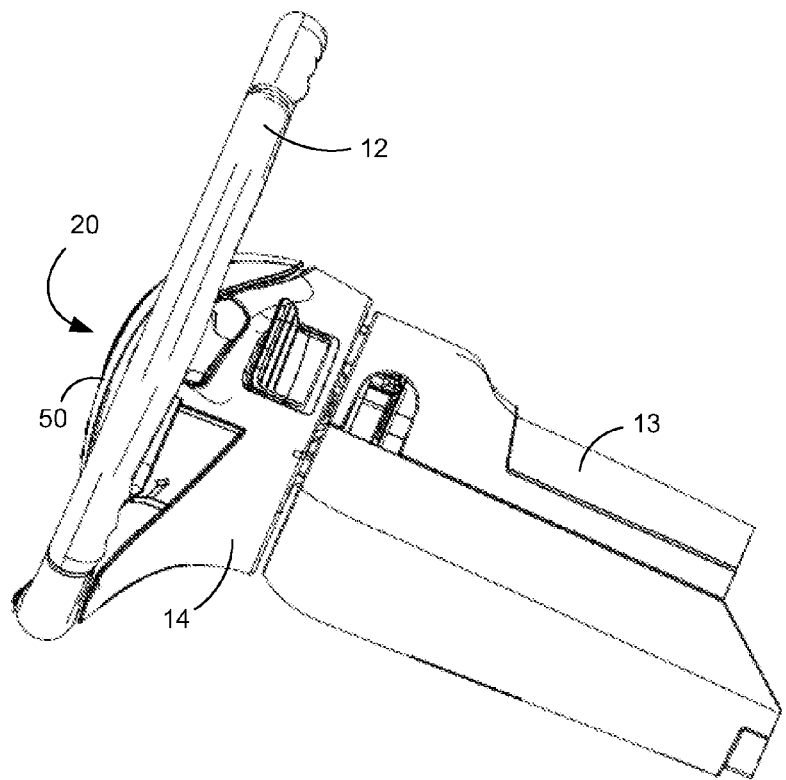
FIG. 4A is a side view of the coupled driver-side airbag module and steering wheel of FIG. 2.
Figure 4B:
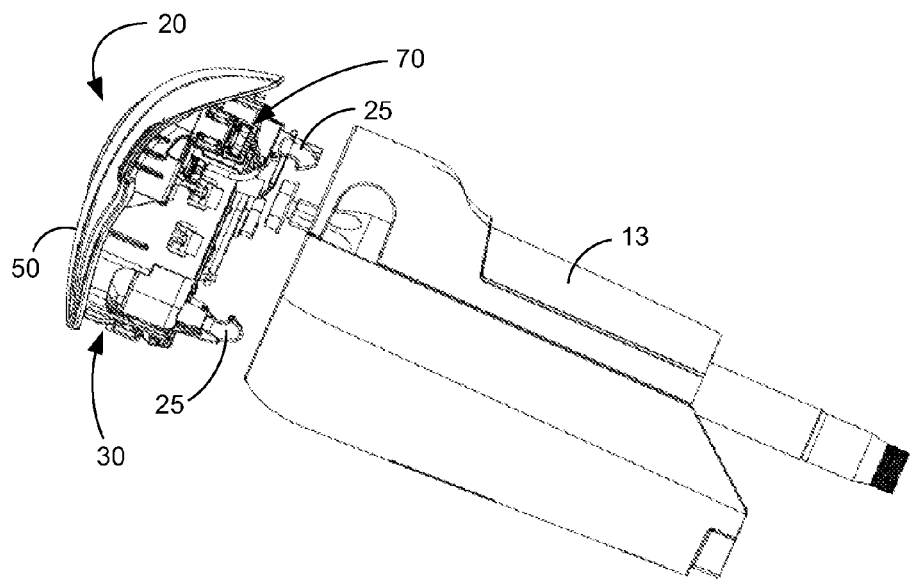
FIG. 4B is a side view of the driver-side airbag module of FIG. 4A, shown prior to coupling of the airbag module and the steering column and with the steering wheel removed for clarity.
Figure 5:
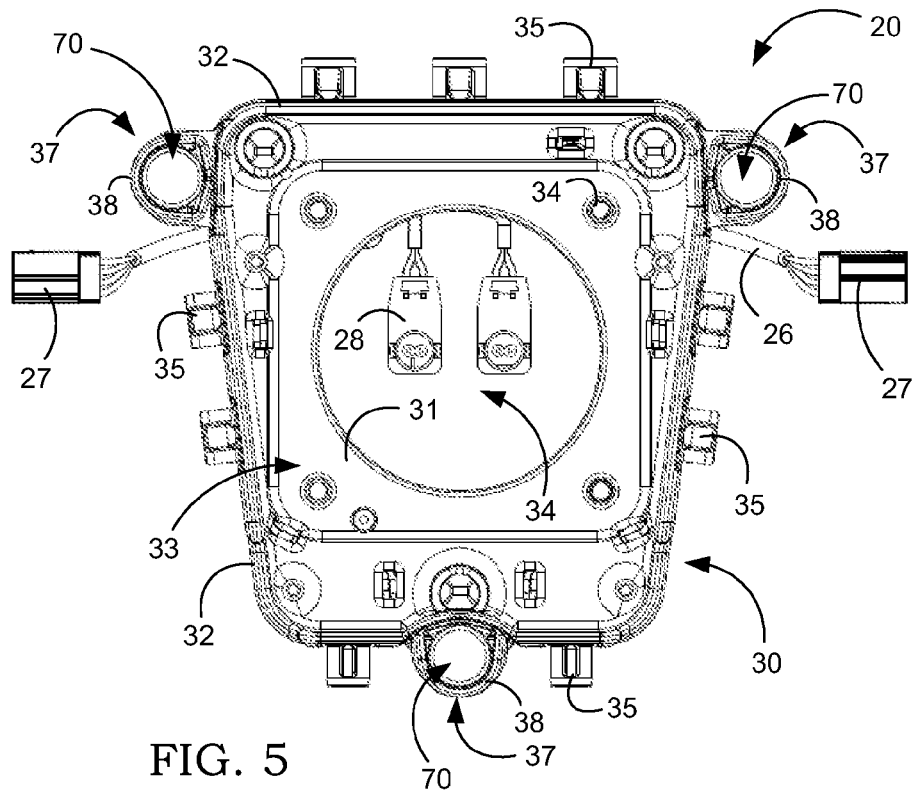
FIG. 5 is a front view of the airbag module of FIG. 2 with the cover, airbag cushion and inflator removed for clarity.
Figure 6:
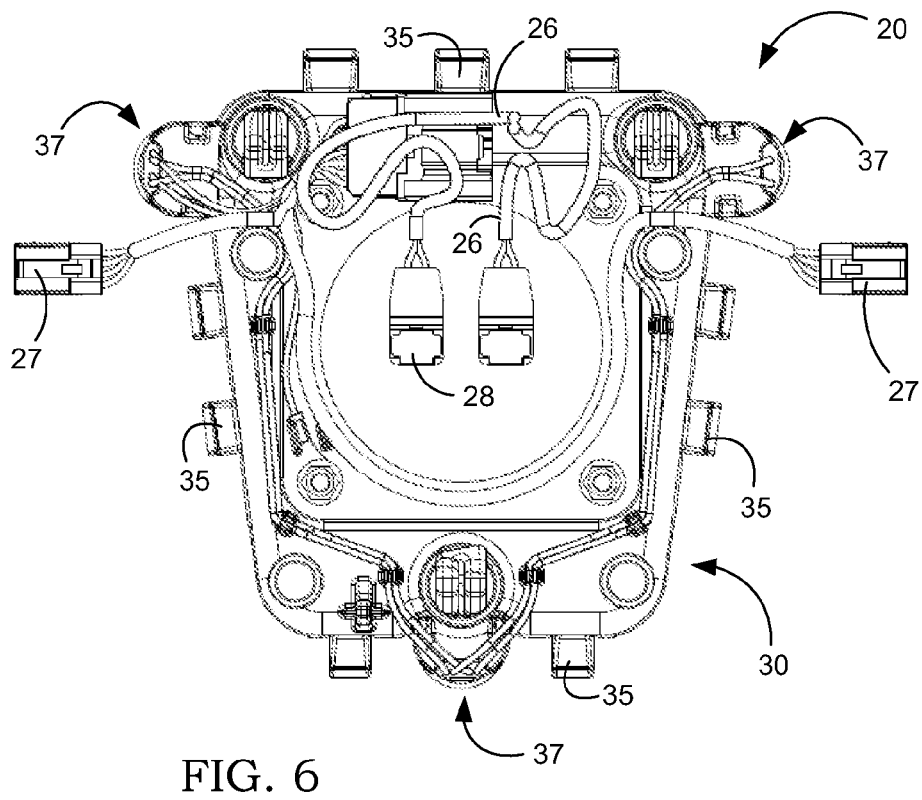
FIG. 6 is a rear view of the airbag module of FIG. 5.
Figure 7:
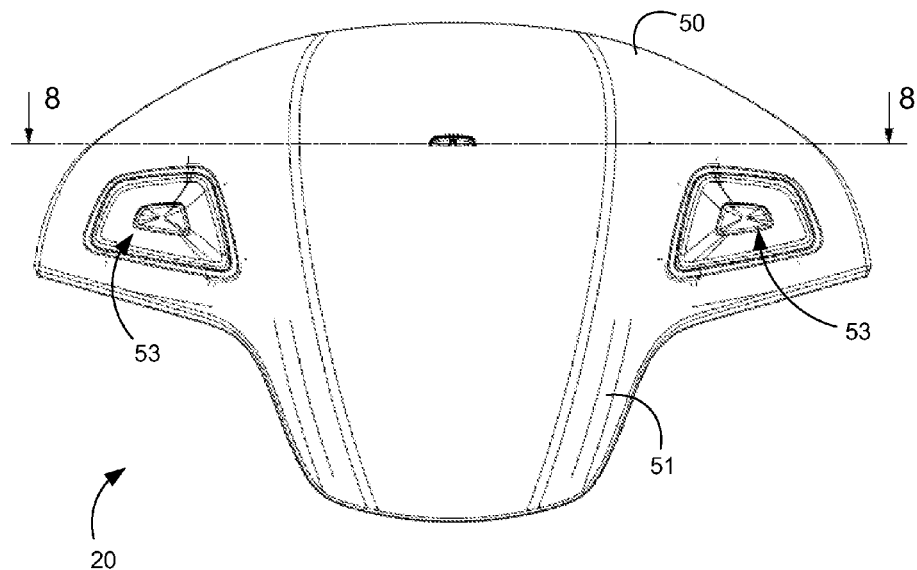
FIG. 7 is a front view of the airbag module of FIG. 2.

As shown in FIGS. 2-4B, the DAB module 20 may be coupled to the steering wheel 12 of the vehicle, wherein the collective steering wheel 12 and DAB module 20 may be coupled to the steering column 13. The steering column 13 may be configured to be coupled to the vehicle. The DAB module 20 may be coupled to the steering wheel 12 through any suitable method. For example, conventional fasteners (e.g., bolts, studs, etc.) may connect the DAB module 20 to the steering wheel 12. The DAB module 20 and/or the steering wheel 12 may include a plurality of attachment members 25 to connect the coupled DAB module 20 and steering wheel 12 to the steering column 13. FIG. 4B shows the DAB module 20 prior to installation with the steering column 13 to illustrate the attachment members 25. The attachment members 25 of the steering wheel 12 may be hook shaped and configured to engage a receiving member (not shown) of the steering column 13. The coupled DAB module 20 and steering wheel 12 may also include one or more covering panel 14, such as to improve the aesthetics by covering the internal components of the DAB module.

The collective DAB module 20 and steering wheel 12 may include one or more than one electrical connector (not shown), wherein each electrical connector of the steering wheel 12 is configured to electrically connect to an electrical connector 27 of the airbag module 20 to provide electric power to the airbag module 20. According to an exemplary embodiment, the electrical connector 27 is a pin and socket connector having a plurality of pins, whereby each pin is provided within a corresponding socket. The pin and socket connector 27 is configured to engage a mating connector having a similar configuration. It should be noted that the number of pins and sockets may be varied depending on the desired number of circuits, and accordingly may be tailored to meet different customer requirements. It should also be noted, that the electrical connector 27 may be configured using any suitable device for transferring electric power or communicating electrically, and the connectors disclosed herein are not meant to be limitations. The steering wheel 12 and/or DAB module 20 may include additional electrical connectors that are configured to connect to mating electrical connectors in the steering column 13 in order to provide electric power from the vehicle to the steering wheel 12 (and DAB module 20 provided therein).

FIGS. 3-8 illustrate an exemplary embodiment of an airbag module 20 configured to be coupled to the steering wheel 12 of the vehicle 10. The airbag module 20 includes an inflatable airbag cushion 24, an inflator 21 for providing inflation gas to inflate the airbag cushion 24, a housing 30, a cover (or cover member) 50, and a switch assembly 70. The inflator 21 may be coupled to the housing 30, and the airbag cushion 24 may be coupled to the inflator 21 and/or the housing 30 to allow the cushion to deploy from the airbag module 20 to provide restraint to the occupant. The cover 50 may slideably couple to the housing 30 to enclose the airbag cushion 24 (until deployment of the cushion), so that the cover 50 may slide (or displace or move), relative to the housing 30 to activate the switch assembly 70, when depressed, such as by the occupant.

The inflator 21 is configured to inflate and deploy the airbag cushion 24, upon activation. The inflator 21 may produce inflation gas that may be generated almost instantaneously, such as by a pyrotechnic device, whereby inflation gas is forced into the airbag cushion 24 inducing the cushion to expand to first breach the airbag module (e.g., the cover), then to inflate to provide restraint to the occupant. The inflator 21 may include a flange 22 configured to couple the inflator 21 to the housing 30, such as through one fastener (e.g., rivet) 23 or a plurality of fasteners. The inflator 21 may be electrically connected to a device, such as a control module of the vehicle, which receives input data, such as from sensors located on the vehicle, that determine based on the input data that the vehicle is undergoing an event that necessitates airbag deployment, whereby the control module may activate the inflator 21. For example, the inflator 21 may electrically connect to an electrical connector 28 configured as a pin and socket connector, which may be electrically connected through a wiring harness 26 to another electrical connector 27 that is configured to electrically connect the airbag module 20 to the vehicle 10. It should be noted that any now known or future developed inflator may be configured within the airbag modules disclosed herein, and the inflators disclosed herein are not meant as limitations.

The airbag cushion 24 may be made from one panel or a plurality of panels, whereby each panel may be made from any suitable material (e.g., woven nylon fabric) having any suitable shape. The panels may be connected, such as by stitching, to form the airbag cushion 24 having any suitable shape, which may be tailored to meet specific customer requirements. The airbag cushion 24 may be manipulated into a stored configuration through a process involving folding, rolling, or a combination of folding and rolling to reduce the packaging volume that the airbag cushion occupies, in order for the airbag cushion 24 to fit in the housing 30. The airbag cushion 24 may also be vacuum sealed to provide the sealed airbag cushion with an internal stored pressure that is lower relative to the atmospheric pressure. It should be noted that the airbag cushion may be made using any now known or future developed configuration, and the airbag cushions disclosed herein are not meant to be limitations.

According to an exemplary embodiment, the housing 30 includes a thin-walled base 31 and a plurality of thin walls 32 that extend at an angle (e.g., substantially 90 degrees, 70 degrees, etc.) from the base 31, which together form a cavity 33 that is configured to receive the stored airbag cushion 24. The housing 30 may be made from a polymer, composite, or any suitable material that is strong enough to withstand the forces generated by the inflator and airbag cushion during airbag deployment, and may be made through injection molding or any suitable manufacturing method. The housing 30 may include a plurality of attachment members 25 to connect the airbag module 20 to the steering column 13. The attachment members 25 may be integrally formed with the housing 30, such as with the base 31, or formed separately then connected to the housing 30.

The housing 30 may include one opening 34 or a plurality of openings 34, which may be configured with similar or dissimilar sizes and/or shapes. For example, the base 31 may include a first large circular opening 34 that is configured to receive the inflator 21, and may further include four smaller circular openings 34 that are configured to receive the fasteners 23 to couple the inflator 21 to the base 31 of the housing 30.

Figure 18:
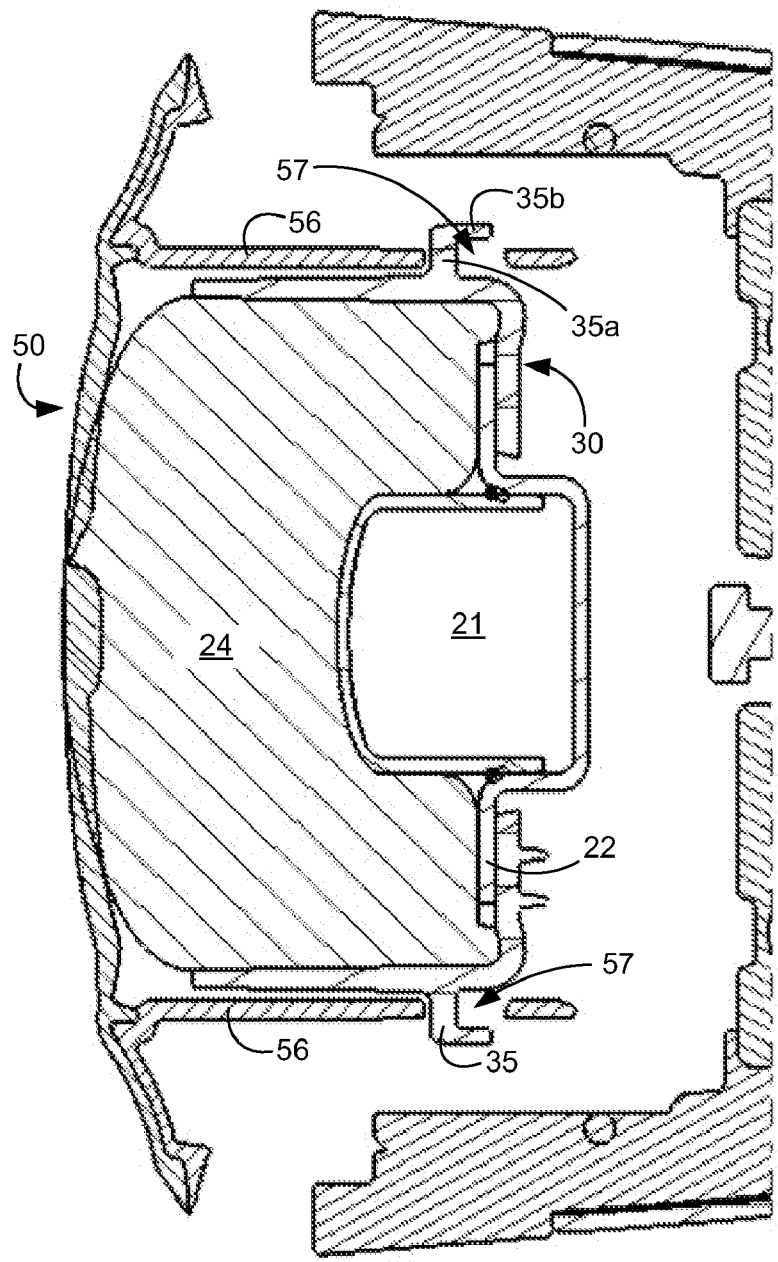
FIG. 18 is a cross-sectional view of the airbag module of FIG. 9, illustrating the cover in the installation position, prior to assembly of the electronic switch, with the tabs of the housing aligned with the corresponding openings of the cover.

The housing 30 may further include a plurality of tabs (or hooks) 35 that are configured to engage the cover 50 to allow the cover 50 to slide relative to the housing 30, yet retain the cover 50 to prevent separation from the housing 30, such as during airbag deployment. According to an exemplary embodiment, the tabs 35 are located on the outside surface of each wall 32 and are configured to have an L-shaped cross-sectional (as shown in FIG. 18). The L-shaped cross-section may be configured to include a first portion 35a that extends substantially perpendicular away from the outside surface of the wall, and a second portion 35b that extends substantially perpendicular away from the first portion 35a, thereby forming a channel between the second portion 35b and the wall 32 of the housing 30 that may receive a portion of the cover 50, depending on the position of the cover 50. The length of the second portion 35b of the tab 35 may be tailored to the size of the corresponding opening in the cover 50 in order to allow the cover 50 to be assembled over the tab 35 to slideably couple the cover 50 to the housing 30, yet also to retain the cover 50 to prevent its separation from the housing 30. The length of the first portion 35a of the tab 35 may be tailored to accommodate the thickness of the portion of the cover 50 that is configured to pass into the channel, such that there is enough clearance between the cover 50 and the housing 30 to prevent high friction (and accordingly high efforts to actuate the horn via depressing the cover relative to the housing).

The housing 30 may further include a socket 37 configured to house at least a portion of the switch assembly 70. According to an exemplary embodiment, the housing 30 includes three sockets 37, each configured to receive at least a portion of one switch assembly 70. According to an exemplary embodiment, the socket 37 includes a semi-circular wall 38 that extends from the outer surface of the wall 32 of the housing 30, and a bottom portion 39. Together the circular wall 38 and the bottom portion 39 form a first compartment 41 that is configured to house at least a portion (e.g., the actuator, the spring) of the switch assembly 70. The bottom portion 39 of the socket 37 may include an opening 40 that is configured to allow a portion (e.g., the actuator) of the switch assembly 70 to pass therethrough. The housing 30 may further include an extruded portion 42, which may extend from the base 31. The extruded portion 42 may be offset a distance from the bottom portion 39 of the socket 37, thereby together forming a second compartment 43 that is configured to house at least a portion (e.g., electronic switch) of the switch assembly 70.

According to an exemplary embodiment, the cover 50 is configured to slideably couple to the housing 30 to enclose the airbag cushion 24 inside the cavity 33 of the housing 30, whereby the cover 50 is configured to slide (or displace or move) relative to the housing 30 between a first (or free) position and a second (or activated) position. The cover 50 may be configured to slide when depressed, such as from a force applied by the driver of the vehicle, whereby the cover 50 slides in the direction toward the housing 30 and the airbag cushion 24 provided therein. The cover 50 may be moved to the second position, upon displacement of the cover 50 by a predetermined distance, whereby the cover 50 may activate the switch assembly 70, thereby activating the device, such as a horn, electrically connected to the switch assembly 70. When the force applied by the driver depressing the cover 50 is removed, the cover 50 may be configured to return (i.e., move) back to the first position by means of a biasing member (e.g., spring).

Figure 8:
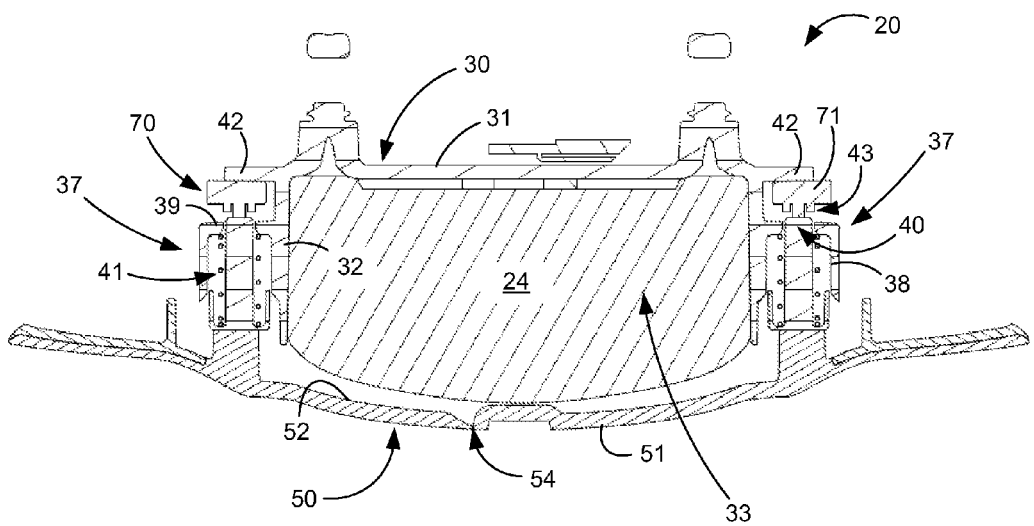
FIG. 8 is a cross-sectional view of the airbag module of FIG. 7 taken along line 8-8.

The cover 50 may include an exterior (or outside) surface 51 configured to provide a tailored aesthetic appearance, which may include utility features 53, such as buttons, that the driver of the vehicle may activate, such as during operation of the vehicle, to control vehicle devices (e.g., radio, cruise control, etc.). The shape of the cover 50 may be irregular and may be tailored to the customer design requirements for the vehicle (e.g., steering wheel). The cover 50 may also include a separating feature 54, such as a tear seam, that is configured to tear a portion of the cover or separate the cover 50 into at least two portions to allow the deploying airbag cushion 24 to breach the airbag module 20 through the cover 50 without impediment or delay, thereby allowing the airbag cushion 24 to inflate to a position to restrain the occupant. For example, as shown in FIG. 8, the cover 50 may include a tear seam 54 configured to extend in a substantially vertical direction along an interior (or inside) surface 52 of the cover 50, whereby during airbag deployment, the force of the inflating airbag cushion induces the tear seam 54 to separate creating an opening in the cover 50 for the inflating cushion to deploy through to a position provided between the driver of the vehicle and the steering column 13. The tear seam 54 may be configured to extend the entire length (or width) of the cover 50, or extend a length less than the entire length of the cover.

The cover 50 may include legs or walls 56 configured to extend away from the inside surface 52 of the cover toward the housing 30, upon assembly of the cover to the housing. According to an exemplary embodiment, the cover 50 includes four walls 56 configured in a shape similar to that of the four walls 32 of the housing 30, so that the walls 56 of the cover 50 are adjacent to the walls 32 of the housing 30 when the cover 50 is slideably coupled to the housing 30. The walls 56 of the cover 50 may include openings (or apertures) 57 configured to receive the tabs 35 of the cover 50. As shown in FIG. 18, the size of the opening 57 of the wall 56 of the cover 50 may be tailored to accommodate the size of the second portion 35b of the tab 35 of the housing 30, so that the tab 35 (e.g., the second portion 35b) may pass through or into the opening 57, thereby slideably coupling the cover and the housing. The position and/or the size of the openings (and corresponding tabs) may be varied to ensure correct alignment of the cover to the housing upon assembly.

Figure 10:
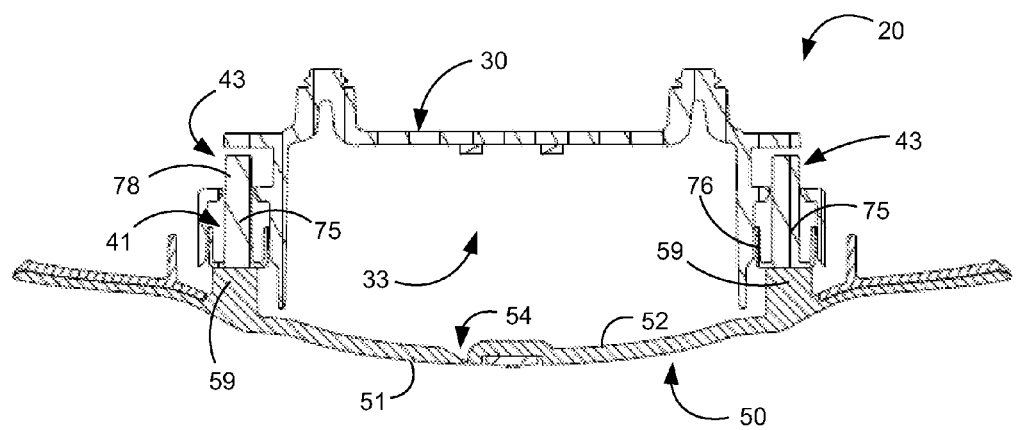
FIG. 10 is a cross-sectional view of the airbag module of FIG. 9 taken along line 10-10.
Figure 11:
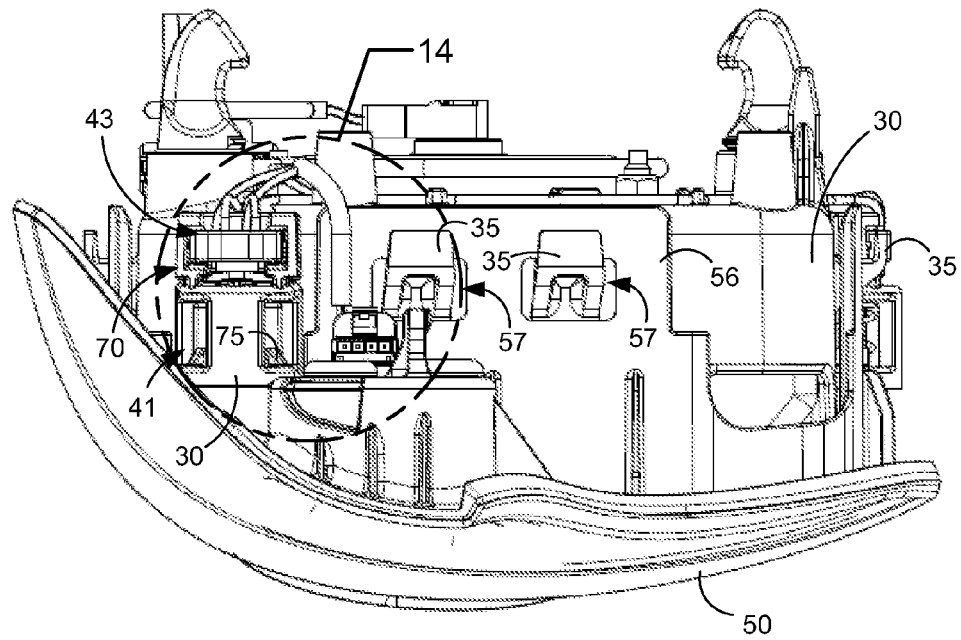
FIG. 11 is a side view of the airbag module of FIG. 2 after assembly of the electronic switch and with the cover shown in the free position corresponding to the open switch position.

As shown in FIG. 10, the cover 50 may also include extruded portions 59 configured to abut at least a portion (e.g., the actuator) of the switch assembly 70, so that sliding (or movement) of the cover 50, such as movement induced by depressing the cover by the driver, in turn moves the abutting portion of the switch assembly 70, to thereby activate the electronic switch, as discussed in more detail below. According to an exemplary embodiment, the cover 50 includes three extruded portions 59, whereby each extruded portion 59 is configured to engage at least a portion of one switch assembly.

Figure 17:
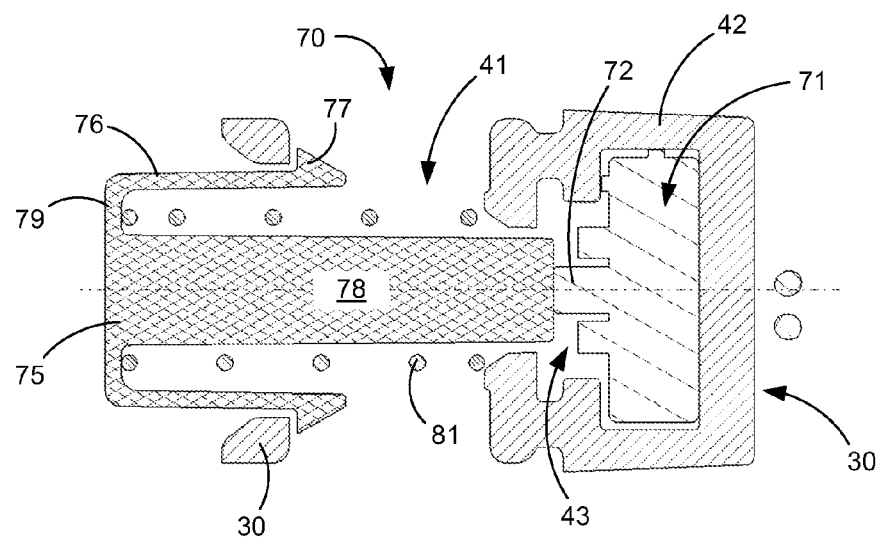
FIG. 17 is a cross-sectional view of the airbag module of FIG. 16, illustrating the cover and the actuator in the depressed position and the electronic switch in the closed position.
Figure 16:
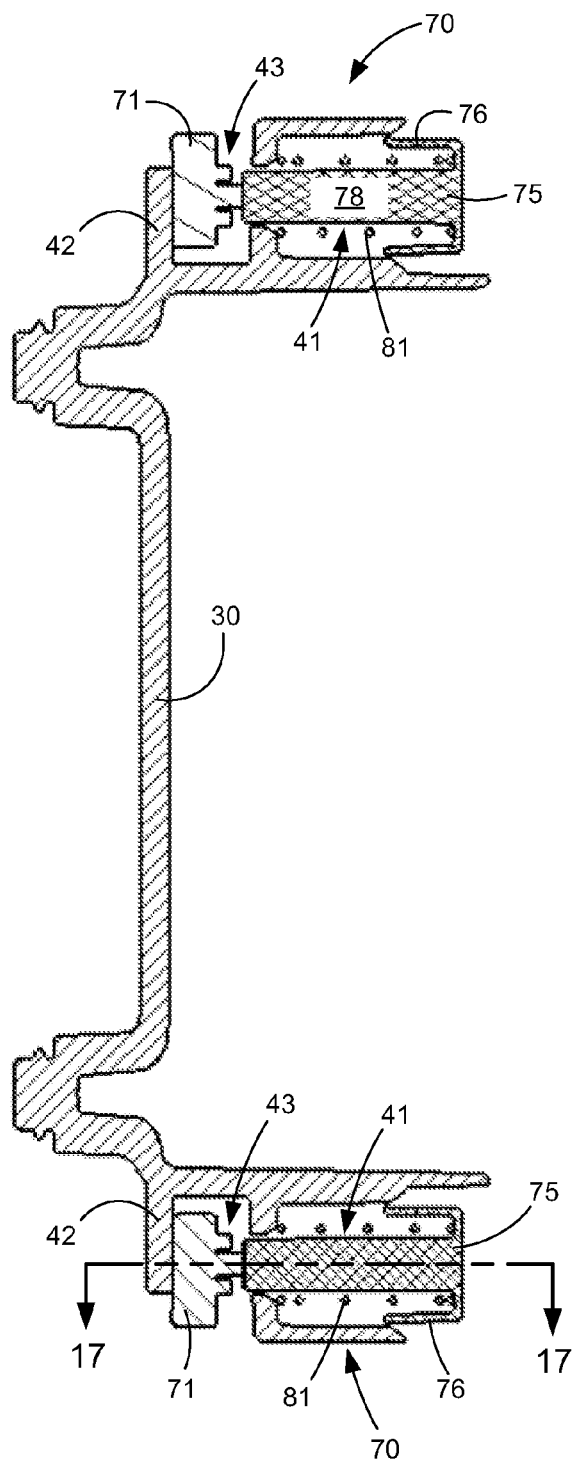
FIG. 16 is a cross-sectional view of the airbag module of FIG. 15, illustrating the cover in the depressed position corresponding to the closed switch position.

According to an exemplary embodiment, the switch assembly 70 is configured to activate the horn mechanism (or assembly) of the vehicle when the electronic switch is activated or closed. The switch assembly 70 may be configured to have a closed (or an activated) position whereby the horn sounds and an open (or deactivate or non-activated) position whereby the horn does not sound. According to the exemplary embodiment shown in FIG. 17, the switch assembly 70 includes an electronic switch 71, an actuator 75, and a biasing member 81. The actuator 75 may be configured to displace (or move) to selectively engage and close the electronic switch 71 (and therefore the electric circuit as well), to activate the electronic switch 71 and switch assembly 70 sounding the horn mechanism of the vehicle. The driver may induce a force by depressing the cover 50, which displaces or moves the actuator 75 into engagement with the electronic switch 71, thereby closing the switch assembly 70 and sounding the horn mechanism. When the driver removes the force on the cover 50, the biasing member 81 may provide a counter force (i.e., force configured with a vector in the direction opposing the force induced by the driver) that displaces the actuator 75 out of engagement with the electronic switch 71, thereby deactivating the electronic switch 71 and opening the switch assembly 70 (and deactivating the horn mechanism). It should be noted that the airbag modules including the switch assemblies and electronic switches, as disclosed herein, may be configured to activate other electronic devices of the vehicle, and although the exemplary embodiment disclosed relates to a horn mechanism, it is not meant as a limitation.

The electronic switch 71 may be configured to couple to the housing. According to an exemplary embodiment, the electronic switch 71 is configured to couple to the housing 30 through a snap-fit feature, such that the electronic switch 71 is provided in the second compartment 43 of the housing 30. For example, the electronic switch 71 may couple (e.g., snap) to the extruded portion 42 of the housing 30. The electronic switch 71 may couple to the housing 30 using other methods, such as through mechanical fasteners or adhesives.

The electronic switch 71 may include a contact 72 that is configured to activate and deactivate the electronic switch 71, which may be induced by the movement or displacement of the actuator 75. According to an exemplary embodiment, the contact 72 of the electronic switch 71 is configured to move when a force is applied to the face of the contact 72, such as a force from the actuator 75. The movement of the contact 72 by a predetermined distance activates the electronic switch 71, such as by closing the switch and circuit, thereby activating the electrically connected device (e.g., horn mechanism). The electronic switch 71 may include an internal biasing member (e.g., spring) that moves or displaces the contact 72 to a free (or deactivated or non-activated) position, upon removal of the force on the contact 72 thereby opening the switch assembly 70 and the electric circuit. According to another exemplary embodiment, the contact 72 may be configured to be activated upon contact (or abutment) by another device that includes a mating contact to complete the electrical connection and the electric circuit. Thus, the actuator 75 may be configured with a contact that upon contact with the contact 72 of the switch, the electrical connection is closed and the horn (or other electrically connected device) is activated. It should be noted that the switch may be configured using other known or future developed methods, and those disclosed herein are not meant as limitations.

According to an exemplary embodiment, the actuator 75 includes a base 79, a guide 76 that extends from the base 79, and a contact 78 also extending from the base 79. The actuator 75 may be configured for use in (e.g., to slide within) the first compartment 41 formed by the housing 30. The guide 76 may be an annular outer wall that is configured to slide adjacent (or abutting) to at least a portion of the housing 30, whereby the portion of the housing 30 may influence (or guide) the direction of sliding of the actuator 75. The guide 76 may include a detent 77 near the end opposite the base 79, whereby the detent 77 may limit the linear travel of the actuator 75, such as in the direction away from the electronic switch 71. The detent 77 may be configured as a ramped extrusion that allows for relative easy insertion of the actuator 75 into the first compartment 41 of the housing 30, but prevents the actuator 75 from sliding out of the first compartment 41 of the housing 30 and limiting the travel of the actuator 75. The contact 78 may extend within the annular guide 76 from the base 79 a predetermined distance, which may be as long as the length of the guide 76, shorter than the length of the guide 76, or longer than the length of the guide 76. The contact 78 may be cylindrically shaped and offset from the guide 76, thereby forming an annular gap (or void) between the contact 78 and the guide 76. The contact 78 may be configured to selectively contact the contact 72 of the switch 71 to close or activate the electronic switch 71 and switch assembly 70.

According to an exemplary embodiment, the biasing member 81 is a coil extension spring configured to occupy the annular gap between the contact 78 and guide 76 of the actuator 75, whereby one end of the spring 81 is configured to abut the base 79 of the actuator 75 and the other end of the spring 81 is configured to abut the housing 30 (or the electronic switch 71). Thus, the spring 81 provides a force between the actuator 75 and the housing 30 (or electronic switch 71) that drives the actuator 75 away from the electronic switch 71. When the cover 50 of the airbag module 20 is depressed, such as by the driver, the cover 50 displaces the actuator 75 compressing the spring 81 (and storing energy) until the actuator 75 closes (or activates) the electronic switch 71, thereby activating the device (e.g., horn mechanism) electrically connected to the electronic switch 71. When the driver removes the force on the cover 50, the stored energy in the spring 81 displaces the actuator 75 away from and out of engagement with the electronic switch 71, thereby driving the cover 50 back to a non-activated or free position. As discussed above, the guide 76, such as by the detent 77, may limit the travel of the actuator 75 through contact with the housing 30 to maintain the actuator 75 and spring 81 within the first compartment 41 of the housing 30.

Figure 9:
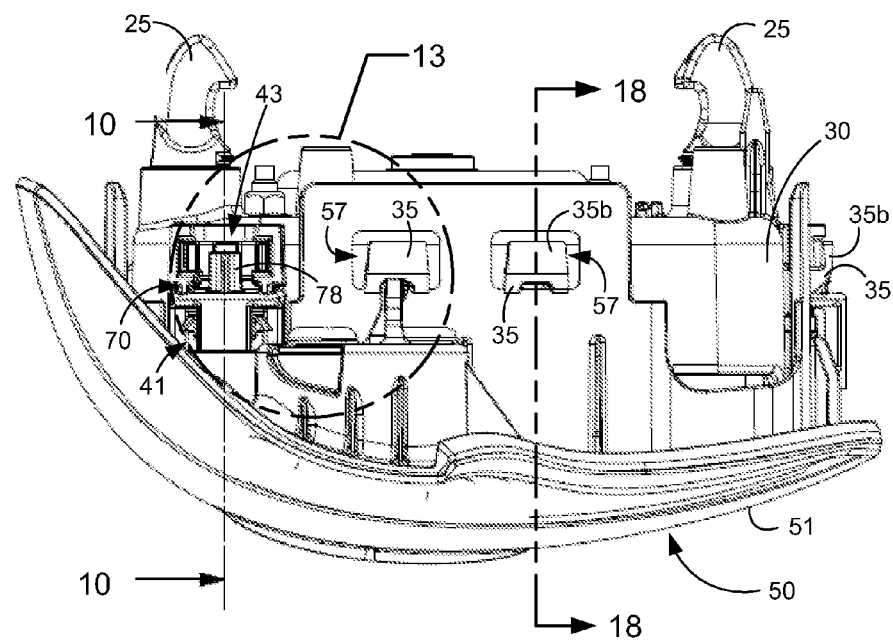
FIG. 9 is a side view of the airbag module of FIG. 2 prior to assembly of the electronic switch and with the cover shown in the installation position relative to the housing.

As shown in FIGS. 9-19, the airbag module 20 has an improved configuration that allows for an improved, simplified, and relative lower cost method of assembly of the module. The improved airbag module configuration disclosed herein allows for a longer length of engagement of the tab 35 of the housing 30 to the cover 50 to provide improved retention of the cover 50 to the housing 30, such as during airbag deployment. The improved airbag configuration, disclosed herein, also allows for a simplified design by having fewer components, such as by having a single coil (or compression) spring 81 with each switch assembly 70, as well as an improved assembly process. This allows for a relative lower horn activation effort (i.e., the force required to depress the cover to activate the switch and horn mechanism). The floating cover design utilized herein reduces the sprung mass, which allows for a relative spring rate. Additionally, the airbag module can be assembled utilizing mechanical snaps in place of heat staking According to an exemplary embodiment, the airbag module 20 is assembled using a six step process. The first step involves coupling the inflator 21 to the housing 30. The second step involves connecting the airbag cushion 24 to the inflator 21 within cavity 33 of the housing 30. The third step involves assembling (or inserting) the actuator 75 and the spring 81 into the first compartment 41 of the socket 37 of the housing 30. The fourth step involves slideably coupling the cover 50 to the housing 30. As shown in FIGS. 9, 10, and 18, the cover 50 may slide far enough in the direction toward the housing 30 (relative to the housing 30) to allow the tabs 35 of the cover 50 to be aligned adjacently to the openings 57 of the cover 50, whereby the tabs 35 may pass through and engage the openings 57. When the cover 50 slides toward the housing 30, the cover 50 abuts the actuator 75 through the extruded portions 59, such that displacement of the cover 50 relative to the housing 30 results in a substantially similar displacement of the actuator 75 (in turn compressing the spring 81 increasing stored energy therein). The cover 50 is permitted to slide far enough in the direction toward the housing 30 to allow the tabs 35 to be provided adjacent to their respective opening 57, since the second compartment 43 of the housing 30 is open (i.e., the switch 71 has not been installed yet) and thereby allows the actuator 75 (e.g., the contact 78 of the actuator 75) to enter the second compartment 43, as shown in FIGS. 9 and 10. The fifth step involves displacing the cover away from the housing. The stored energy of the spring 81 then drives (or displaces) the actuator 75 and the cover 50 in the direction away from the housing 30, thereby driving the contact 78 out of the second compartment 43 of the housing 30. The sixth step involves installing the electronic switches 71 into their respective second compartments 43 of the housing 30. The electronic switch 71 may couple to the housing 30 through the snap-connection.

Figure 12:
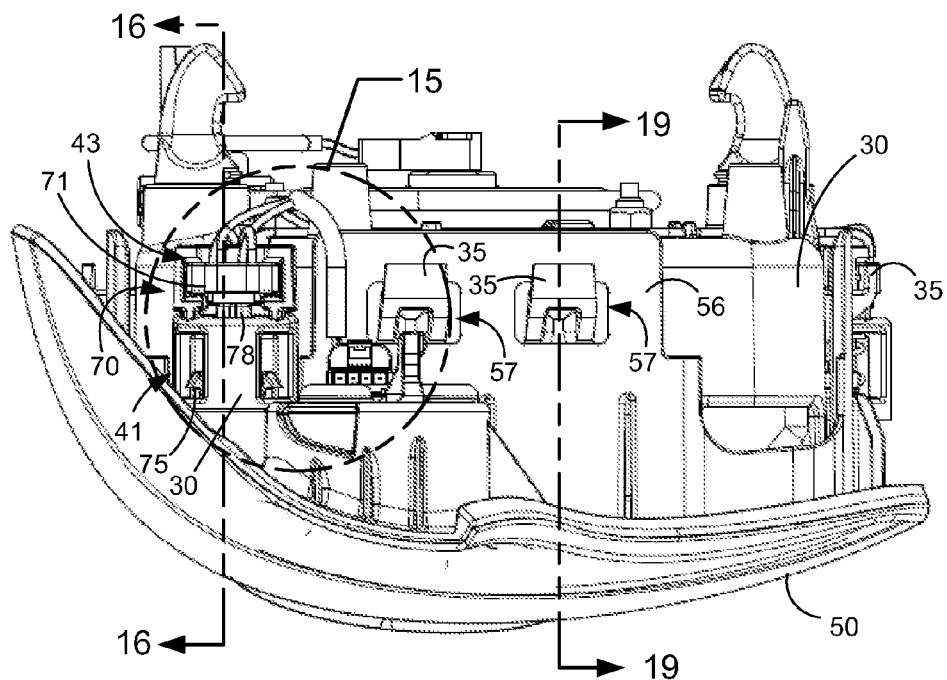
FIG. 12 is a side view of the airbag module of FIG. 2 after assembly of the electronic switch and with the cover shown in the depressed position corresponding to the closed switch position.
Figure 13:
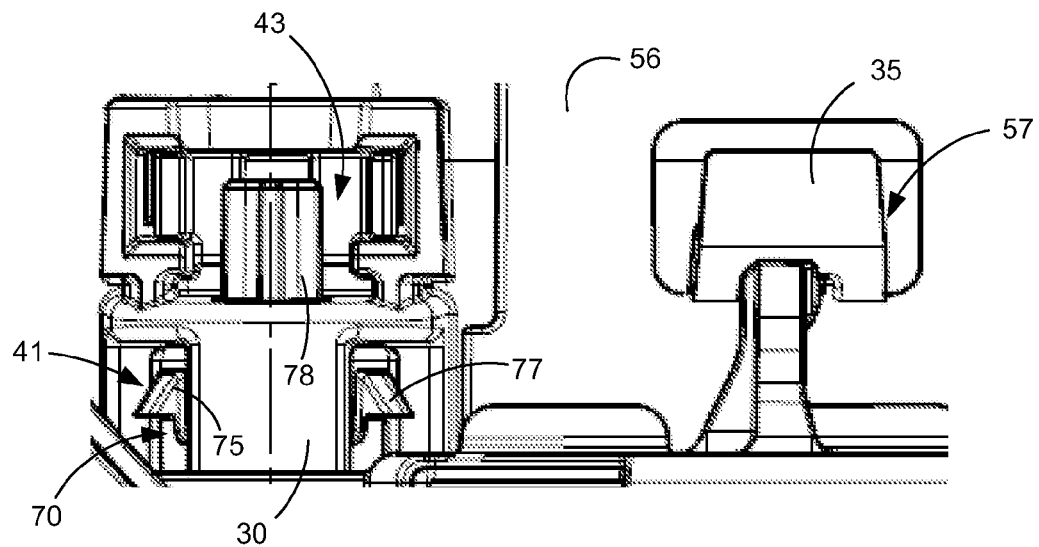
FIG. 13 is a detail view of the airbag module of FIG. 9, illustrating the cover in the installation position with the tab of the cover aligned with the opening of the housing, prior to assembly of the electronic switch.
Figure 14:
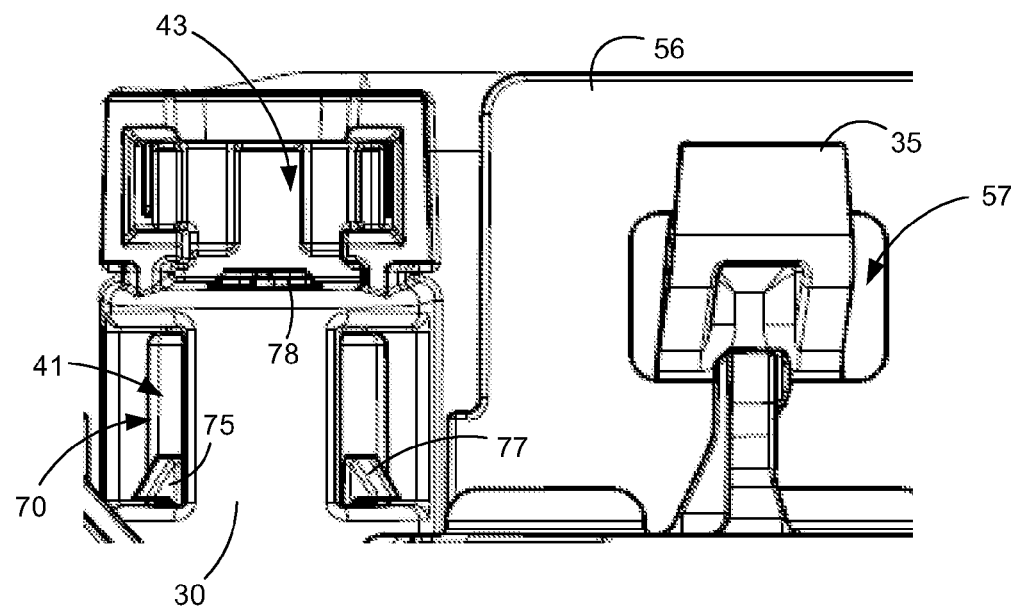
FIG. 14 is a detail view of the airbag module of FIG. 11, prior to installation of the electronic switch, illustrating the cover in the free (or non-depressed) position corresponding to the open switch position.
Figure 15:
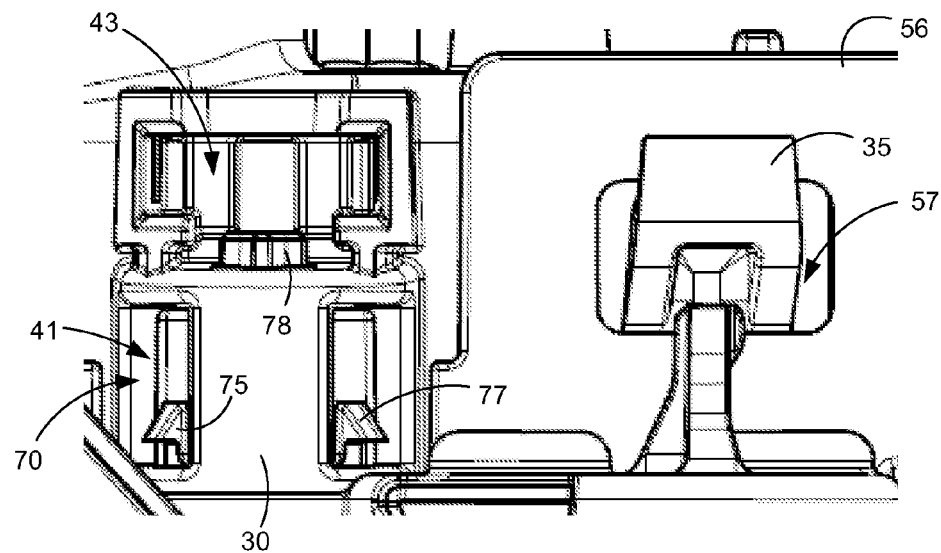
FIG. 15 is a detail view of the airbag module of FIG. 12 with the electronic switch removed for clarity, illustrating the cover in the depressed position corresponding to the closed switch position.
Figure 19:
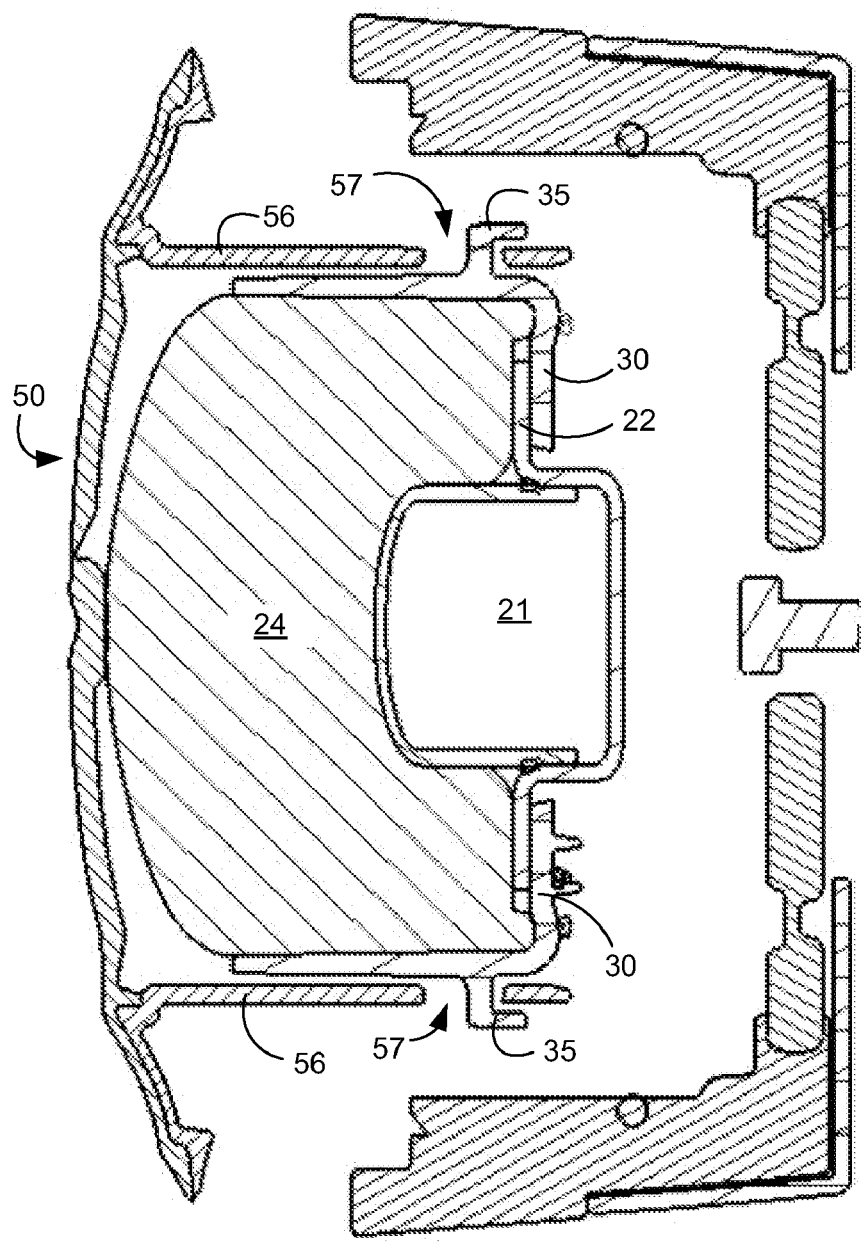
FIG. 19 is a cross-sectional view of the airbag module of FIG. 12, illustrating the cover in the depressed position corresponding to the closed switch position, and showing the tabs of the housing unable to realign with the openings of the cover, thereby retaining the cover to the housing.

Once the electronic switch 71 is provided in the second compartment 43 of the housing 30, as shown in FIGS. 11, 12, 16 and 19, the electronic switch 71 limits the displacement (or travel) of the actuator 75 in the direction toward the electronic switch 71, since the actuator 75 will contact the electronic switch 71 to activate the switch. This limited displacement of the actuator 75 in turn limits the displacement of the cover 50, thereby preventing the cover 50 from being able to move far enough toward the housing 30 to allow the cover 50 to become decoupled from the housing 30, such as by preventing the tab 35 of the housing 30 from adjacently realigning with the opening 57 of the cover 50. As shown in FIGS. 12 and 19, when the contact 78 of the actuator 75 abuts (and activates) the contact 72 of the electronic switch 71, which is the maximum allowed displacement of the cover 50 toward the housing 30, the tabs 35 of the housing 30 still retain the walls 56 of the cover 50, thereby preventing decoupling of the cover and housing.

The airbag module 20 may be configured such that the occupant (e.g., driver) may depress the cover 50, which in turn displaces the actuator 75 toward the electronic switch 71, whereby after a predetermined displacement the contact 78 of the actuator 75 contacts the contact 72 of the electronic switch 71, thereby closing (or activating) the electronic switch 71 causing the horn mechanism to sound. Upon release of the force by the driver on the cover 50, the spring 81 that was compressed between the actuator 75 and the housing 30 (or electronic switch 71) drives the cover 50 and actuator 75 away from the housing 30, thereby opening (or deactivating) the electronic switch 71 causing the horn mechanism to go silent (i.e., cease to sound).

Upon activation of deployment of the airbag module 20, such as during a dynamic vehicle event triggering airbag deployment, the stored airbag cushion 24 is inflated by inflation gas generated by the inflator 21, whereby the deploying airbag cushion 24 breaches the cover 50, such as by tearing the separating feature 54 then passing through an opening formed therein to allow the airbag cushion 24 to further deploy beyond the cover 50 and module. The airbag cushion 24 of the airbag module 20 continues to deploy to a position provided between the driver and the steering column 13 (including the airbag module 20) of the vehicle to provide restraint to the driver during the vehicle event to reduce the likelihood of injury of the driver. The inflated airbag cushion 24 may form any now known or future developed configuration. Additionally, the inflated configuration of the airbag cushion 24 may be tailored to accommodate varying customer and/or vehicle requirements.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbag systems as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag and horn switch module for use in a vehicle to provide restraint to an occupant and to provide selective activation of a horn assembly of the vehicle, comprising:
    an inflatable airbag cushion configured to deploy from a stored configuration to provide restraint to the occupant;
    an inflator configured to inflate the airbag cushion upon deployment;
    a housing having a base and a plurality of walls extending from the base thereby forming a cavity configured to house the airbag cushion, and having the inflator attached thereto;
    wherein at least one wall of the housing has at least one tab protruding therefrom;
    a switch assembly including an electronic switch and an actuator; and
    a cover having a wall with at least one opening configured to receive the tab of the housing to thereby slideably couple the cover to the housing;
    wherein the cover is configured to slideably couple to the housing prior to installation of the electronic switch of the switch assembly by aligning the tab of the housing with the opening in the cover, thereby providing an increased length of engagement between the tab of the housing and the cover;
    wherein the cover is configured to slide relative to the housing when the cover is depressed by the occupant, whereby the cover displaces the actuator into engagement with the electronic switch thereby activating the horn assembly of the vehicle.

2. The module of claim 1, further comprising a biasing member provided between the housing and the actuator of the switch assembly, such that displacement of the cover and actuator relative to the housing induced by the occupant depressing the cover compresses the biasing member storing energy therein.

3. The module of claim 2, wherein upon the occupant removing the force depressing the cover, the stored energy in the biasing member displaces the actuator and the cover away from the housing and switch, thereby deactivating the horn of the vehicle.

4. The module of claim 1, further comprising a wiring harness having an electrical connector to communicate electrically between the electronic switch and the horn assembly of the vehicle.

5. The module of claim 1, wherein the housing includes a socket configured to receive at least a portion of the switch assembly.

6. The module of claim 5, wherein the socket of the housing receives the actuator of the switch assembly, and guides the actuator during displacement to activate the electronic switch.

7. The module of claim 1, wherein the housing includes a compartment configured to receive at least a portion of the electronic switch of the switch assembly.

8. The module of claim 7, wherein the electronic switch couples to the compartment to retain the electronic switch to the housing.

9. The module of claim 1, wherein the cover includes a tear seam configured to separate during deployment of the airbag cushion to allow the inflating cushion to deploy beyond the module to a position to provide restraint to the occupant.

10. The module of claim 1, wherein the module is positioned in a steering wheel assembly and configured to engage the steering column of the vehicle.

11. The module of claim 10, further comprising an attachment member for connecting the module to the steering column of the vehicle.

12. The module of claim 1, wherein after installation of the electronic switch to the housing, the cover is unable to slide a distance relative to the slideably coupled housing that would realign the opening in the cover and the tab of the housing, thereby preventing the cover from becoming decoupled from housing, such as during airbag deployment.

13. A method of constructing an airbag and horn switch module for use in a vehicle to provide restraint to an occupant and to provide activation of a horn assembly of the vehicle, comprising:
   a first step of installing an inflator to a housing;
   a second step of connecting a folded airbag cushion to the inflator in the housing;
   a third step of inserting an actuator and a biasing member within a socket of the housing;
   a fourth step of slideably coupling a cover to the housing;
   wherein the cover is displaced toward the housing in turn displacing the actuator into a compartment of the housing, and compressing the biasing member thereby storing energy therein;
   wherein the cover is displaced toward the housing until an opening in a wall of the cover aligns with a tab extending from a wall of the housing, whereby the tab of the housing engages the opening of the cover;
   a fifth step of displacing the cover away from the housing, whereby the stored energy of the biasing member displaces the actuator out of the compartment of the housing; and
   a sixth step of installing an electronic switch into the compartment of the housing, thereby retaining the coupled cover to the housing by preventing the cover from being able to displace toward the housing a distance that would realign the opening of the cover and the tab of the housing.

14. The method of constructing the module of claim 13, wherein the third step includes inserting a plurality of actuators and biasing members within a plurality of sockets of the housing, such that each socket includes one actuator and one biasing member.

15. An electronic switch assembly for use in an airbag and horn assembly module to provide selective activation of a horn assembly of the vehicle by an occupant, the airbag and horn assembly module also having a housing and a cover that is slideably coupled to the housing, the electronic switch assembly comprising:
   an electronic switch configured to couple to the housing, and configured to operate in an open position or a closed position;
   wherein the electronic switch is normally configured in the open position whereby the horn assembly of the vehicle is deactivated;
   wherein the electronic switch includes a contact, and is configured in the closed position when the contact moves a predetermined distance, whereby the horn assembly of the vehicle is activated;
   an actuator configured to move the contact of the electronic switch the predetermined distance when the cover is depressed by the occupant; and
   a spring positioned between the electronic switch and the actuator;
   wherein the spring is configured to bias the actuator away from the contact of the electronic switch to thereby configure the electronic switch in the open position.

16. The electronic switch assembly of claim 15, wherein the actuator includes a guide provided adjacent to a portion of the housing to align the actuator with the contact of the electronic switch.

17. The electronic switch assembly of claim 16, wherein the guide is annular and extends from a base, which is adjacent to a portion of the cover.

18. The electronic switch assembly of claim 16, wherein the guide surrounds at least a portion of the spring thereby retaining the spring.

19. The electronic switch assembly of claim 18, wherein the actuator also includes a contact portion configured to directly contact the contact of the electronic switch.

20. The electronic switch assembly of claim 19, wherein the spring is provided between the contact portion and the guide of the actuator.

* * * * *